(12) United States Patent
Hokkirigawa et al.

(10) Patent No.: US 6,573,215 B2
(45) Date of Patent: *Jun. 3, 2003

(54) MATERIAL FOR BEARING ROLLING ELEMENT

(75) Inventors: Kazuo Hokkirigawa, Yonezawa (JP); Rikuro Obara, Nagano-ken (JP); Motoharu Akiyama, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 109 days.

This patent is subject to a terminal disclaimer.

(21) Appl. No.: 09/990,430

(22) Filed: Nov. 21, 2001

(65) Prior Publication Data

US 2002/0111388 A1 Aug. 15, 2002

(30) Foreign Application Priority Data

Dec. 15, 2000 (JP) ........................ 2000-382248

(51) Int. Cl.$^7$ ..................... B01J 20/26; B01J 20/00; C01B 31/00
(52) U.S. Cl. ..................... 502/402; 264/29.1; 264/29.4; 264/29.5; 264/29.7; 423/447.4; 423/447.9; 522/404; 521/84.1
(58) Field of Search ................. 521/84.1; 502/402, 502/404; 264/29.1, 29.4, 29.5, 29.7; 423/447.4, 447.9

(56) References Cited

U.S. PATENT DOCUMENTS 3,927,157 A * 12/1975 Vastering
4,306,059 A * 12/1981 Yokobayashi et al.
6,124,028 A * 9/2000 Nagle

OTHER PUBLICATIONS

*Development of Hard and Porous Carbon Material "RB Ceramics" Using Rice Bran as a Starting Material*, translation from "Zairyou Kagaku" vol. 17, No. 6, pp. 24 to 27, May 1997), (10 pages).

Applicants Kazuo Hokkirigawa, et al., copending U.S. patent application Ser. No. 09/990 429, filed Nov. 21, 2001, entitled "Sleeve Bearing Arrangement" (11 pages, including 1 drawing sheet).

* cited by examiner

*Primary Examiner*—Morton Foelak
(74) *Attorney, Agent, or Firm*—Flynn, Thiel, Boutell & Tanis, P.C.

(57) ABSTRACT

A porous material suitable for use in a bearing rolling element. The porous material is obtained by a process which includes mixing degreased bran derived from rice bran with a thermosetting resin before kneading, subjecting a kneaded mixture to a primary firing in an inert gas at a temperature in a range of 700 to 100° C., pulverizing the kneaded mixture after the primary firing into carbonized powders sieved through a screen of 100-mesh, mixing the carbonized powders or the carbonized powders and ceramic powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C.

8 Claims, No Drawings

MATERIAL FOR BEARING ROLLING ELEMENT

BACKGROUND OF THE INVENTION

1. Field of the Invention

The present invention relates to porous material suitable for use in bearing rolling elements, and more particularly, to a porous material suitable for use in a bearing rolling element, obtained by a process comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through a screen of 100-mesh, mixing the carbonized powders or the carbonized powders and ceramic powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C.

2. Description of the Related Art

Alloy, and ceramics such as silicon nitride, and so forth have been in widespread use up to now as a material for a rolling element of bearings such as ball bearings, roller bearings, and so forth. The material for the rolling element of such bearings is required to have surface hardness, a small thermal-dimensional-change characteristic, and so forth besides mechanical strength. An alloy-based material naturally comes to have a higher density, causing degradation in bearing characteristics at the time of acceleration due to weight thereof while ceramics are not only susceptible to impact and expensive although low in density but also electrical insulators, thereby requiring means for prevention of electrostatic buildup.

Meanwhile, an attempt to obtain a porous carbonaceous material by utilizing rice bran discharged in quantity of 900,000 tons a year in Japan and as much as 33 million tons a year throughout the world has been well known by researches carried out by Mr. Kazuo HOKKIRIGAWA, the first inventor of the present invention (refer to "Functional Material", May issue, 1997, Vol. 17, No. 5, pp. 24~28).

Herein are disclosed a carbonaceous material obtained by mixing and kneading degreased bran derived from rice bran with a thermosetting resin, drying a formed kneaded mixture prepared by pressure-forming, and firing the formed kneaded mixture as dried in an minert gas, and a method of producing the same.

With such a method as described above, however, it has been practically difficult to form the formed kneaded mixture with precision because there occurs discrepancy in dimensions by as much as 25% in terms of a contraction ratio of the dimensions of the formed kneaded mixture prepared by the pressure-forming to those of a finished formed product obtained after the firing in the inert gas.

SUMMARY OF THE INVENTION

The invention has been developed to solve the problem described above, and it is therefore an object of the invention to provide a porous material suitable for use in a bearing rolling element, having such properties as a small contraction ratio of the dimensions of a formed workpiece formed thereof to those of a finished product, excellent electric conductivity, small thermal strain, insusceptibility to damage, light weight, a long service life, and still ability to retain oil and grease for a long period of time, thereby providing a high-tech eco-material (state-of-the-art material excellent in ecological adaptability) utilizing biomass resources, different from conventional industrial material.

The inventors have been successful in development of a porous material suitable for use in fabricating a high-precision bearing rolling element having excellent properties as material for use in fabricating the bearing rolling element, and a small contraction ratio of the dimensions of a formed workpiece formed thereof to those of a finished product.

The inventors have found out that it is possible to obtain a porous material suitable for use in a bearing rolling element, having such properties as a small contraction ratio of the dimensions of a formed workpiece formed thereof to those of a finished product, excellent hot oil resistance, small thermal-dimensional-change, insusceptibility to damage, light weight, a long service life, and ability to retain oil and grease for a long period of time by making effective use of the degreased bran derived from the rice bran discharged in quantity of 900, 000 tons a year in Japan and as much as 33 million tons a year throughout the world, and has thereby completed the invention.

The inventor of the present invention has conducted intense studies, and found out that a porous material is obtained by a process comprising the steps of mixing the degreased bran derived from the rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through a screen of 100-mesh, mixing the carbonized powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C., and the porous material thus obtained has ideal characteristics as material suitable for use in bearing rolling elements.

More specifically, the porous material described above has the small contraction ratio of the dimensions of a formed workpiece formed thereof to those of a finished product as low as 3% or less, 13 wt % of oil retention characteristic, $4.85 \times 10^{-3}$ Ωcm of volume resistivity, and density in a range of 1.1 to 1.3 g /cm$^3$, and further, it has been possible to obtain the porous material having Vickers hardness not less than 300~600, and still friction coefficient in the order of about 0.15 after fired at a high temperature.

DESCRIPTION OF THE PREFERRED EMBODIMENTS

Degreased bran derived from rice bran, used in carrying out the present invention, may be either of domestic origin or of foreign origin regardless of the kind of rice.

Further, any thermosetting resin may be used as long as it has thermosetting property, and typically cited as a thermosetting resin are a phenol resin, diaryl phthalate resin, unsaturated polyester resin, epoxy resin, polyimide resin, and triazine resin. In particular, the phenol resin is preferably used.

Furthermore, a thermoplastic resin such as polyamide, and so forth can be used in combination with a thermosetting resin provided that it is done without departing from the spirit and scope of the invention.

As ceramics that can be substituted for a portion of carbonized powders, there are cited $Si_3N_4$, $ZrO_2$, $Al_2O_3$, SiC, BN, WC, TiC, sialon (solid solution of a Si—Al—O—N type compound), and so forth.

According to the invention, use can be made of one kind or not less than two kinds of ceramics selected from the group consisting of the ceramics described above. Ceramics not greater than 50 μm in particle size are desirable, ones not greater than 20 μm in particle size is preferable, and further, ones of particle size in a range of 0.3 to 3 μm is more preferably used.

An effect of stabilizing surface hardness is obtained by substituting ceramics not greater than 50 μm in particle size for a portion of the carbonized powders. The carbonized powders can be well mixed with ceramic powders, and a mixing ratio of the former to the latter can be 5~95:95~5 by weight.

A mixing ratio of the degreased bran to a thermosetting resin is 50~90:50~10 by weight, however, a mixing ratio of 75:25 is preferably used.

For the thermosetting resin used in this case, one in a liquid state, having a relatively small molecular weight, is desirable.

A primary firing is applied at a temperature in a range of 700 to 100° C. using normally a rotary kiln for firing time in a range of about 40 to 120 minutes.

A mixing ratio of the carbonized powders after the primary firing to a thermosetting resin is 50~90:50~10 by weight, however, a mixing ratio of 75:25 is preferably used.

A kneaded mixture of the carbonized powders after the primary firing and the thermosetting resin is pressure-formed at a pressure in a range of 20 to 30 MPa, and a pressure in a range of 22 to 25 MPa is preferably used. A mold is preferably at a temperature of about 150° C.

A heat treatment is applied at a temperature in a range of 100 to 1100° C. normally in a well-controlled electric furnace. Firing time is in a range of about 60 to 360 minutes.

As a porous material for use in a bearing rolling element, according to the invention, becomes porous after the heat treatment is applied at a high temperature, Vickers hardness thereof undergoes wide fluctuation, but generally tends to be related to a firing temperature. The porous material subjected to the heat treatment at a temperature in a range of 100 to 400° C. has excellent mechanical property.

Conversely, one subjected to the heat treatment at a temperature not lower than 1100° C. will have a small Vickers hardness value, and is not suitable as the material for the bearing rolling element.

A warming rate up to the primary firing temperature is required to be relatively moderate up to 500° C. In terms of more specific values, the warming rate is in a range of 0.5 to 2° C. 1 min, preferably 1° C./min.

Further, in lowering the temperature of the kneaded mixture after baked, a relatively moderate cooling rate is required up to 500° C. Upon the temperature dropping to 500° C. or lower, the kneaded mixture is left to cool by itself. In terms of more specific values, the cooling rate is in a range of 0.5 to 4° C./min, preferably in a range of 1 to 2° C./min.

Further, for an inert gas, any of helium, argon, neon, and nitrogen gas may be used, however, nitrogen gas is preferably used.

Embodiments of the invention are summed up as follows:

(1) a porous material suitable for use in a bearing rolling element, obtained by a process comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through a screen of 100-mesh, mixing the carbonized powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C.;

(2) the porous material suitable for use in the bearing rolling element, as described under item (1) above, wherein the thermosetting resin is one kind or not less than two kinds selected from the group consisting of a phenol resin, diaryl phthalate resin, unsaturated polyester resin, epoxy resin, polyimide resin, and triazine resin;

(3) the porous material suitable for use in the bearing rolling element, as described under item (1) or (2) above, wherein a mixing ratio of the degreased bran to the thermosetting resin is 50~90 : 50~10 by weight;

(4) the porous material suitable for use in the bearing rolling element, as described under any one of items (1) to (3) above, wherein a mixing ratio of the carbonized powders to the thermosetting resin is 50~90:50~10 by weight;

(5) the porous material suitable for use in the bearing rolling element, as described under any one of items (1) to (4) above, wherein a particle size of the carbonized powders is in a range of 50 to 250 μm;

(6) the porous material suitable for use in the bearing rolling element, as described under any one of items (1) to (5) above, wherein the thermosetting resin mixed with the degreased bran is in a liquid state, and the thermosetting resin mixed with the carbonized powders is in a solid state;

(7) the porous material suitable for use in the bearing rolling element, as described under any one of items (1) to (6) above, wherein one kind or not less than two kinds of ceramics in powder form, selected from the group consisting of $Si_3N_4$, $ZrO_2$, $Al_2O_3$, SiC, BN, WC, TiC, and sialon are substituted for a portion of the carbonized powders;

(8) the porous material suitable for use in the bearing rolling element, as described under item (7) above, wherein a mixing ratio of the carbonized powders to the ceramics in powder form is 5~95:95~5 by weight;

(9) a process of producing a porous material suitable for use in a bearing rolling element, comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through a screen of 100-mesh, mixing the carbonized powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100°C. before cooling the same at a moderate cooling rate;

(10) the process of producing the porous material suitable for use in the bearing rolling element, as described under item (9) above, wherein the moderate cooling rate is in a range of 1 to 4°C./min up to 500°C.

(11) the process of producing the porous material suitable for use in the bearing rolling element, as described under item (9) or (10) above, wherein the primary firing is applied in a rotary kiln;

(12) the process of producing the porous material suitable for use in the bearing rolling element, as described under any one of items (9) to (11) above, wherein the inert gas is nitrogen gas.

EMBODIMENTS

The invention is described in further detail hereinafter based on preferred embodiments.
(Examples 1 to 7 of the process of producing the porous material suitable for use in the bearing rolling element) 55~75 g of degreased bran derived from rice bran was mixed and kneaded with 15~40 g of a phenol resin (resol) in a liquid state while heating both at a temperature in a range of 50~60°C. A homogeneous mixture having plasticity was thereby obtained.

The mixture was then fired in a nitrogen atmosphere at a temperature in a range of 800 to 1000°C. using a rotary kiln for the duration in a range of 60 to 70 min. A carbonized fired mixture thus obtained was pulverized by use of a crusher, and subsequently, was sieved through a screen of 100-mesh, thereby obtaining carbonized powders of particle size in a range of 50~250 μm.

75 g of the carbonized powders thus obtained, or 45~70 g of the carbonized powders and 10~40 g of one kind or two kinds of ceramic powders, respectively, were mixed and kneaded with 15~25 g of a thermosetting phenol resin (resol) in a solid state while heating a mixture at a temperature in a range of 100~150° C. A homogeneous mixture having plasticity was thereby obtained.

With the process according to Example 4, 45 g of the carbonized powders, 30 g of boron nitride powders 2~3 μm in particle size, and 25 g of the thermosetting phenol resin (resol) were used while with the process according to Example 5, 55 g of the carbonized powders, 20 g of silicon carbide powders 2~3 μm in particle size, and 25 g of the thermosetting phenol resin (resol), with the process according to Example 6, 70 g of the carbonized powders, 10 g of boron nitride powders 2~3 μm in particle size, and 20 g of the thermosetting phenol resin (resol), and with the process according to Example 7, 45 g of the carbonized powders, 20 g of boron nitride powders 2~3 μm in particle size, 20 g of silicon carbide powders 2 ~3 μm in particle size, and 15 g of the thermosetting phenol resin (resol) were used, respectively.

Subsequently, a plastic mixture thus obtained was pressure-formed into the shape of a bearing rolling element at a pressure of 22 MPa. A mold was at a temperature of 150° C.

A formed mixture was taken out of the mold, heated in a nitrogen atmosphere at a warming rate of 1° C./min up to 500° C., held at 500° C. for 60 min, and sintered at 900° C. for about 120 min.

Subsequently, the temperature of the formed mixture was lowered at a cooling rate in a range of 2 to 3° C./min up to 500° C, and upon the temperature dropping to 500° C. or lower, the formed mixture was left to cool by itself.

Table 1 shows various conditions of the process of producing the porous material suitable for use in the bearing rolling element.

TABLE 1

|  | ex. 1 | ex. 2 | ex. 3 | ex. 4 | ex. 5 | ex. 6 | ex. 7 | conv. ex. |
| --- | --- | --- | --- | --- | --- | --- | --- | --- |
| mix. amt. (g) degr'd bran | 75 | 75 | 75 | 80 | 60 | 55 | 85 | 75 |
| t-sett. resin | 25 | 25 | 25 | 20 | 40 | 35 | 15 | 25 |
| prim. firing (° C.) | 900 | 900 | 900 | 850 | 1000 | 1000 | 800 | — |
| time (min) | 60 | 60 | 60 | 60 | 70 | 70 | 60 | — |
| aver. particle size (μm) | 90 | 90 | 90 | 40 | 120 | 50 | 130 | — |
| mix. amt. (g) c. powder | 75 | 75 | 75 | 45 | 55 | 70 | 45 | — |
| boron nitride |  |  |  | 30 |  | 10 | 20 |  |
| sil. c'rbide |  |  |  |  | 20 |  | 20 |  |
| t-sett. resin | 25 | 25 | 25 | 25 | 25 | 20 | 15 |  |
| form. press. MPa | 21.5 | 22.5 | 24.5 | 23.5 | 29.5 | 20.5 | 23.5 | 23.5 |
| heat treat. (° C.) | 900 | 200 | 300 | 800 | 1000 | 1100 | 900 | 900 |
| firing time (hr.) | 120 | 100 | 130 | 120 | 100 | 90 | 120 | 120 |
| warm.rate | 1 | 1.5 | 1 | 1.5 | 2 | 1 | 1 | 1 |
| cool.rate | 2 | left to cool | left to cool | 2 | 3 | 2 | 2 | 2 |
| atm. | nitrogen | nitrogen | nitrogen | nitrogen | nitrogen | nitrogen | nitrogen | nitrogen |

Table 2 shows properties of the porous material suitable for use in the bearing rolling element, obtained by the process according to the examples 1 to 7, and a conventional example thereof.

TABLE 2

|  | ex. 1 | ex. 2 | ex. 3 | ex. 4 | ex. 5 | ex. 6 | ex. 7 | convl. ex. |
| --- | --- | --- | --- | --- | --- | --- | --- | --- |
| d. c. ratio (%) | 2.0 | 2.5 | 2.4 | 1.7 | 1.55 | 1.70 | 1.75 | 25 |
| c. s. (MPa) | 103 | 150 | 140 | 130 | 142 | 125 | 130 | 60 |
| oil ret. wt % | 13.3 | 9.8 | 10.0 | 11.1 | 10.4 | 12.3 | 12.3 | 13.5 |
| vol. res'st. ($10^{-3}$ Ωcm) | 4.85 | 49.0 | 47.5 | 12.2 | 10.7 | 7.2 | 7.2 | 1.4 |
| fr'ctn coeff. (μ) | 0.15 | 0.18 | 0.16 | 0.16 | 0.20 | 0.19 | 0.19 | 0.19 |
| hyg'o scop. (wt %) | 2.5 | 1.7 | 1.8 | 1.9 | 2.1 | 2.1 | 2.1 | 2.9 |

Remarks:
d. c. ratio (dimensional contraction ratio) = (a length of a formed workpiece - a length of a formed product after firing)/(a length of the formed workpiece) × 100 (%).
abbreviation:
conv. ex. = conventional example;
c. s. = compressive strength;
oil ret. = oil retention characteristic;
vol. res'st = volume resistivity;
fr'ctn coeff. = friction coefficient;
hyg'oscop. = hygroscopicity.

Compressive strength was measured by conducting tests on testpieces in a columnar shape of 5 mm (diameter) ×12.5 mm (height). Oil retention characteristic is indicated by a ratio of weight of lubricating oil to that of the testpiece as measured by means of centrifugal separation of the lubricating oil from the testpiece impregnated with the lubricating oil as deaerated at 1150 rpm for 45 seconds. Hygroscopicity was measured by heating the testpieces at 150° C.

for 6 hours, and treating the same in a vacuum desiccator for 20 hours before leaving the same in a room at room temperature for 72 hours.

Table 3 shows friction coefficient.

TABLE 3

| load | 50 Hz |
|---|---|
| 10 N * | 0.19–0.26 |
| 50 N * | 0.33–0.4 |
| 10 N # | 0.16–0.22 |
| 50 N # | 0.27–0.34 |

Remarks:
* without lubricating oil;
with lubricating oil

Tests for friction coefficient were conducted on the material obtained by the process according to Example 1. Friction coefficient was found by use of a SRV tester at 1 mm stroke at room temperature, using a steel ball 10 mm in diameter, and applying a load either 10N or 50N.

Table 4 shows Vickers hardness.

TABLE 4

| Test No. | Hardness Hv |
|---|---|
| 1 | 232 |
| 2 | 376 |
| 3 | 292 |
| 4 | 429 |
| 5 | 315 |
| 6 | 364 |
| 7 | 224 |
| 8 | 463 |
| 9 | 1107 |
| 10 | 409 |

Test for Vickers hardness were conducted on the material obtained by the process according to Example 1. Vickers hardness Hv was measured by use of a Vickers hardness meter. Fluctuation in HV value is due to porous nature of testpieces.

CONVENTIONAL EXAMPLE 7.5 g of degreased bran derived from rice bran was mixed and kneaded with 0.5 g of water and 2.5 g of a phenol resin (resol) in a liquid state, a mixture was dried, and a plastic mixture thus obtained was pressure-formed into the shape of a bearing rolling element at a pressure of 21.5 MPa. a mold was at a temperature of 150° C.

A formed mixture was taken out of the mold, heated in a nitrogen atomoshere at a warming rate of 1° C./min up to 500° C., and sintered at 900° C. for about 120 min.

Subsequently, the temperature of the formed mixture was lowered at a cooling rate in a range of 2 to 3° C./min up to 500° C., and upon the temperature dropping to 500° C. or lower, the formed mixture was left to cool by itself. Table 2 shows properties thereof.

Thus, it has been confirmed that the porous material suitable for use in the bearing rolling element, according to the invention, has novel properties not observed of a conventional material such as a small contraction ratio of the dimensions of a formed workpiece formed thereof to those of a finished product, excellent electrical conductivity, small thermal strain, insusceptibility to damage, light weight, a long service life, and still ability to retain oil and grease for a long period of time.

What is claimed is:

1. A porous material suitable for use in a bearing rolling element, obtained by a process comprising the steps of mixing degreased bran derived from rice bran with a thermosetting resin before kneading, subjecting a kneaded mixture to a primary firing in an inert gas at a temperature in a range of 700 to 1000° C., pulverizing the kneaded mixture obtained after the primary firing into carbonized powders sieved through a screen of 100-mesh, mixing the carbonized powders with a thermosetting resin before kneading, pressure-forming a kneaded mixture thus obtained at a pressure in a range of 20 to 30 MPa, and applying a heat treatment again to a formed kneaded mixture in the inert gas at a temperature in a range of 100 to 1100° C.

2. A porous material suitable for use in a bearing rolling element, according to claim 1, wherein the thermosetting resin is one kind or not less than two kinds selected from the group consisting of a phenol resin, diaryl phthalate resin, unsaturated polyester resin, epoxy resin, polyimide resin, and triazine resin.

3. A porous material suitable for use in a bearing rolling element, according to claim 1, wherein a mixing ratio of the degreased bran to the thermosetting resin is 50~90:50~10 by weight.

4. A porous material suitable for use in a bearing rolling element, according to claim 1, wherein a mixing ratio of the carbonized powders to the thermosetting resin is 50~90:50~10 by weight.

5. A porous material suitable for use in a bearing rolling element, according to claim 1, wherein a particle size of the carbonized powders is in a range of 50 to 250 $\mu$m.

6. A porous material suitable for use in a bearing rolling element, according to claim 1, wherein the thermosetting resin mixed with the degreased bran is in a liquid state, and the thermosetting resin mixed with the carbonized powders is in a solid state.

7. A porous material suitable for use in a bearing rolling element, according to claim 1, wherein one kind or not less than two kinds of ceramics in powder form, selected from the group consisting of $Si_3N_4$, $ZiO_2$, $Al_2 O_3$, SiC, BN, WC, TiC, and sialon are substituted for a portion of the carbonized powders.

8. A porous material suitable for use in a bearing rolling element, according to claim 7, wherein a mixing ratio of the carbonized powders to the ceramics in powder form is 5~95: 95~5 by weight.

* * * * *